United States Patent [19]
McBride et al.

[11] Patent Number: 5,930,872
[45] Date of Patent: Aug. 3, 1999

[54] DEVICE FOR MOUNTING AND DEPLOYING A SHRINKABLE CLAMP

[75] Inventors: David McBride, Westminster; Richard S. Thornwald, Thornton, both of Colo.

[73] Assignee: The Gates Corporation, Denver, Colo.

[21] Appl. No.: 08/935,375

[22] Filed: Sep. 22, 1997

[51] Int. Cl.⁶ .................................................. F16L 33/02
[52] U.S. Cl. ............................................... 24/19; 285/23
[58] Field of Search .................... 285/23, 381.1, 285/381.4, 381.5; 24/19, 268, 205, 16 PB, 25

[56] References Cited

U.S. PATENT DOCUMENTS

| | | |
|---|---|---|
| 565,698 | 8/1896 | Sparks . |
| 2,795,835 | 6/1957 | Kreidel et al. . |
| 2,825,114 | 3/1958 | Kolodin . |
| 2,864,149 | 12/1958 | Seaver et al. . |
| 2,865,077 | 12/1958 | Henning . |
| 2,934,805 | 5/1960 | Zartler . |
| 3,530,898 | 9/1970 | Wilson . |
| 3,808,643 | 5/1974 | Gouge . |
| 3,916,507 | 11/1975 | McGrath .............................. 24/268 X |
| 4,070,044 | 1/1978 | Carrow . |
| 4,308,648 | 1/1982 | Fay . |
| 4,366,011 | 12/1982 | Nolf . |
| 4,402,113 | 9/1983 | Smith . |
| 4,412,370 | 11/1983 | Speirs ........................................ 24/268 |
| 4,480,359 | 11/1984 | Koster . |
| 4,572,552 | 2/1986 | Orevik et al. . |
| 4,574,434 | 3/1986 | Shupe et al. . |
| 4,780,158 | 10/1988 | Thomas . |
| 4,843,686 | 7/1989 | Bartholomew . |
| 4,931,116 | 6/1990 | Rosenzweig . |
| 4,952,437 | 8/1990 | Winterhoff et al. . |
| 5,071,170 | 12/1991 | Panella . |
| 5,115,541 | 5/1992 | Stichel . |
| 5,137,591 | 8/1992 | Gansbuehler et al. . |
| 5,157,815 | 10/1992 | Dyer . |
| 5,169,176 | 12/1992 | Brossard . |
| 5,175,032 | 12/1992 | Orevik et al. . |
| 5,188,400 | 2/1993 | Riley et al. . |
| 5,221,387 | 6/1993 | Robbins et al. . |
| 5,306,368 | 4/1994 | Yamada et al. . |
| 5,329,673 | 7/1994 | Mason . |
| 5,340,167 | 8/1994 | Morse . |

(List continued on next page.)

FOREIGN PATENT DOCUMENTS

| | | |
|---|---|---|
| 56-75825 | 11/1979 | Japan . |
| 56-51324 | 5/1981 | Japan . |
| 58-62012 | 4/1983 | Japan . |
| 2031106 | 4/1980 | United Kingdom . |
| 2182110 | 5/1987 | United Kingdom . |

*Primary Examiner*—James R. Brittain
*Attorney, Agent, or Firm*—Steven G. Austin, Esq.; C. H. Castleman, Esq.; H. W. Oberg, Esq.

[57] ABSTRACT

A device is provided for mounting and deploying a shrinkable clamp for hose and tubing. The device includes an annular housing in the form of a partial cylinder having a first diameter and longitudinal opening defined along its length by first and second circumferentially spaced longitudinal side edges. A first extension member projects circumferentially from the first side edge into the longitudinal opening, while a second extension member projects circumferentially from the second side edge into the longitudinal opening and is aligned adjacent to the first extension member to define therewith along with the partial cylinder a circumferential outer surface for the housing. A locking mechanism interacts with the first and second extension members for maintaining the relative positions of the first and second extension members and the size of the first diameter when the housing is subjected to a radially compressive force. Finally, a triggering device is provided for disengaging the locking mechanism from the second extension member to permit circumferential movement of the second extension member relative to the first extension member in response to a radial compressive force exerted on the housing to create a second, smaller diameter for the housing which is less that the first diameter.

29 Claims, 12 Drawing Sheets

U.S. PATENT DOCUMENTS

| | | | |
|---|---|---|---|
| 5,388,321 | 2/1995 | Farrell | 285/23 X |
| 5,531,483 | 7/1996 | Christian et al. | |
| 5,548,876 | 8/1996 | Oetiker . | |
| 5,560,087 | 10/1996 | Marques . | |
| 5,566,988 | 10/1996 | Johnston et al. . | |
| 5,607,190 | 3/1997 | Exandier et al. . | |
| 5,642,891 | 7/1997 | Skinner . | |
| 5,647,614 | 7/1997 | Asakura . | |
| 5,675,871 | 10/1997 | Webb et al. | 285/23 X |

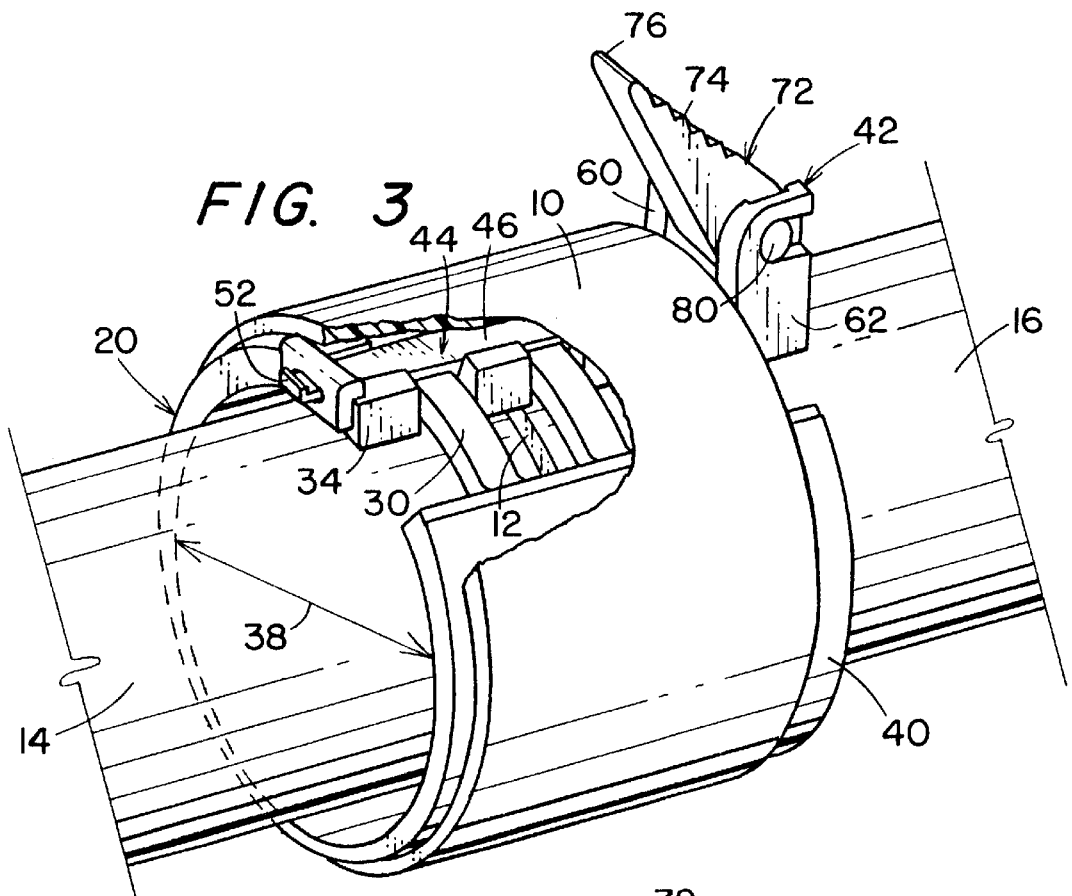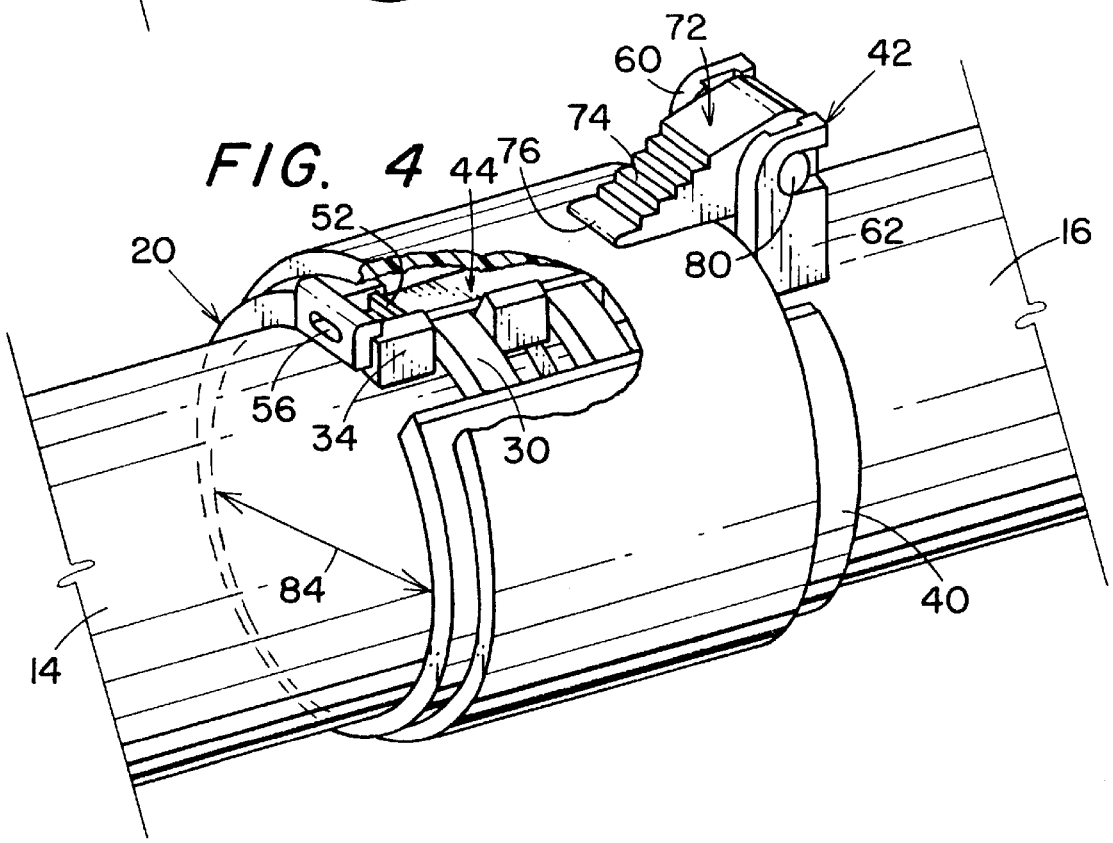

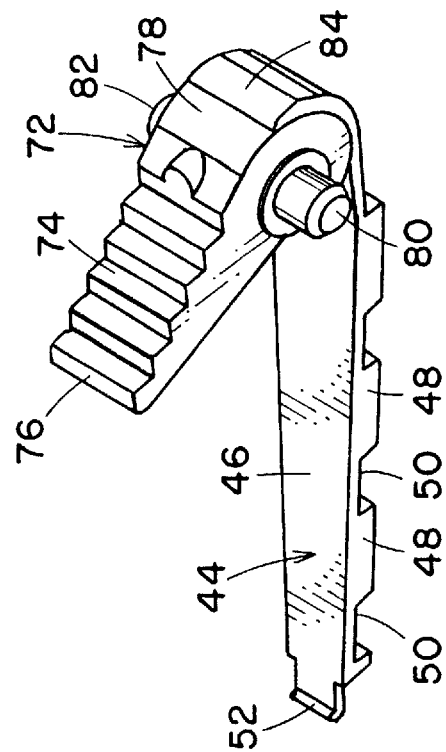
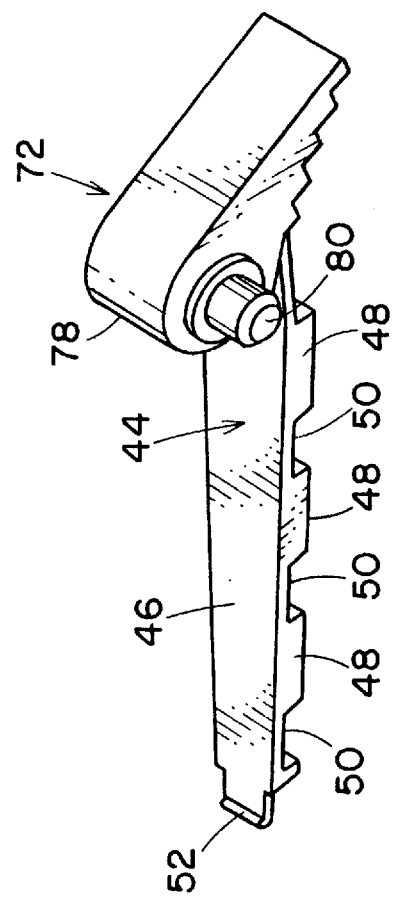
FIG. 7
FIG. 6

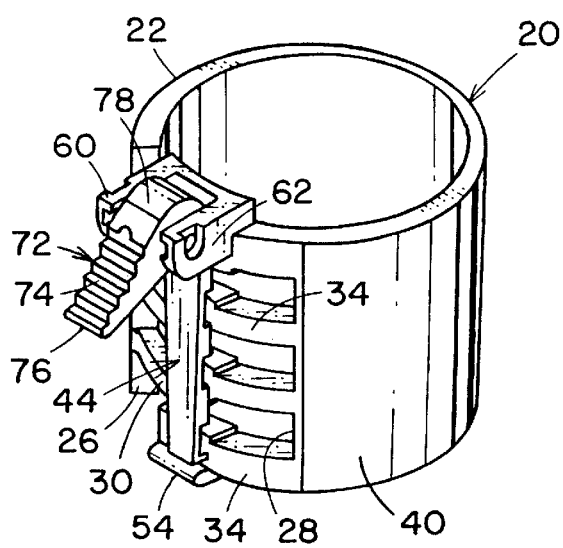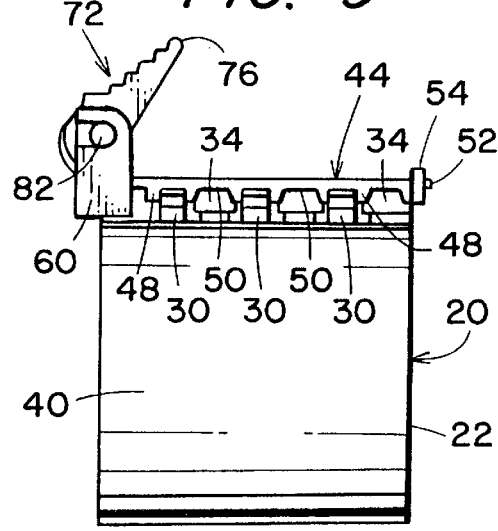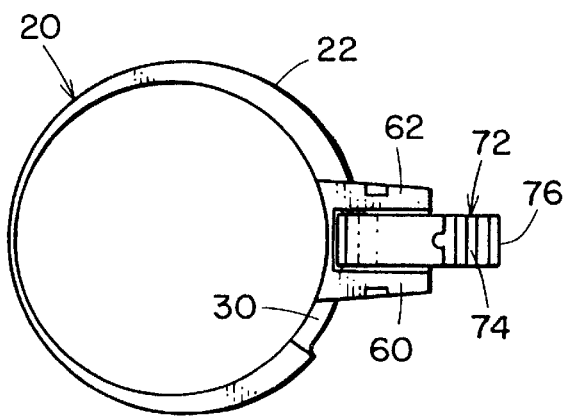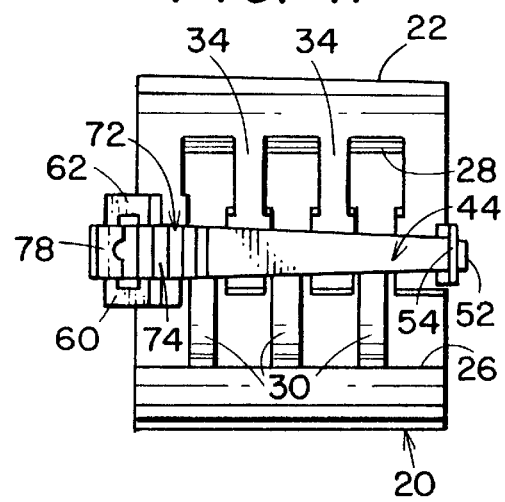

FIG. 15
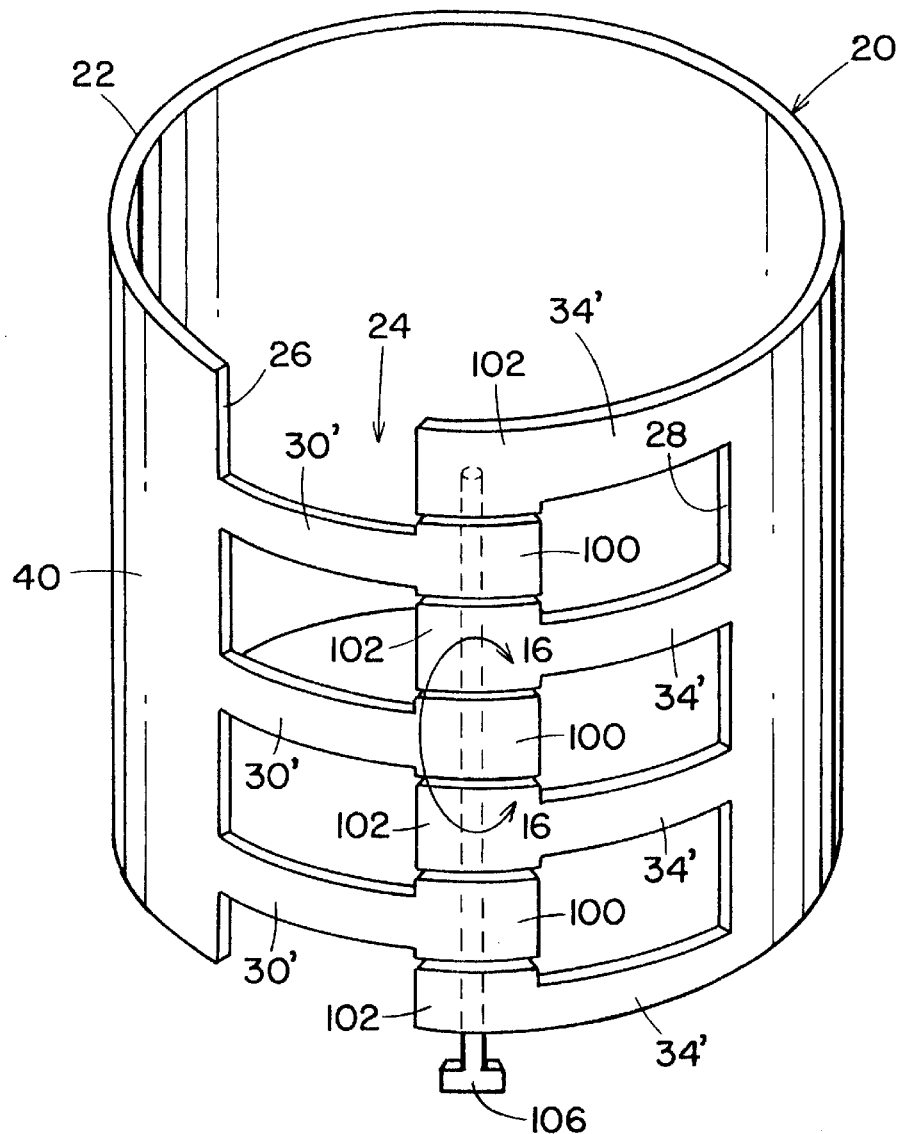
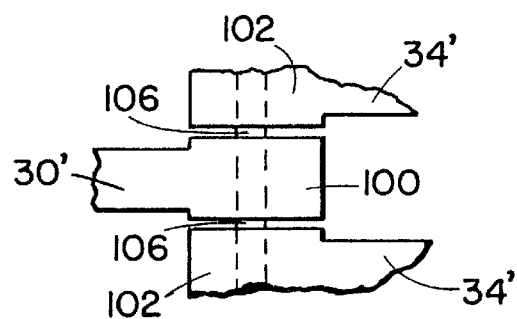
FIG. 16

5,930,872

DEVICE FOR MOUNTING AND DEPLOYING A SHRINKABLE CLAMP

BACKGROUND OF THE INVENTION

1. Field of the Invention

This invention relates generally to the deployment of bands of substantially cylindrical shrinkable polymer material as clamps, for example for elastomeric hose and tubing connections and, more particularly, to a mechanism which assists in the proper deployment, positioning and installation of such a substantially cylindrical shrinkable clamp. More specifically, the present invention relates to a device for mounting and deploying a substantially cylindrical shrinkable clamps without significantly effecting the constrictive force of such a clamp against a joint.

2. Description of the Prior Art

Conduits in the form of reinforced elastomeric hose and tubing are commonly used to convey various fluids which may be under a variety of pressures and temperatures. Junctions between hoses or between hoses and the items with which they communicate must be fluid tight at all temperatures and be able to resist separation that would otherwise occur because of the influence from fluid pressure, i.e. blow-off, as well as the surrounding environment, such as pull-off. Commonly, these connections are made by placing the open end of a hose over a mounting stem or the open end of two hoses over a coupling insert. The hose and associated insert are typically sized and shaped to allow the open end of the hose to slip over the stem or insert and to seat with a snug fit. In many instances, a hose clamp is then installed proximate the open end of the hose to constrict the hose tightly on the stem or insert to assist in resisting leakage, blow-off and pull-off.

Hose clamps are available in a wide variety of styles, shapes and constructions. A common type of hose clamp is in the form of an adjustable mechanical clamp wherein a metal band forms a loop that encircles the tubing joint, and this loop is then reduced in diameter by any number of known mechanical means, such as a threaded screw mechanism, a racheting mechanism and the like. Typical examples of these types of mechanical clamp devices are disclosed in U.S. Pat. Nos. 2,795,835; 2,825,114; 2,864,149; 2,865,077; 2,934,805; 3,808,643; 4,308,648; 4,402,113; 4,480,359; 4,572,552; 4,574,434; 4,843,686; 5,115,541; 5,157,815; 5,188,400; 5,329,673; 5,548,876; 5,560,087; 5,607,190; 5,642,891 and 5,647,614.

This mechanical style of hose clamp is generally simple in construction and can produce relatively substantial dynamic and static hoop stresses. Dynamic hoop stress is a constrictive force the clamp exerts upon the clamped object as a result of the inner diameter of the clamp being actively reduced. The static hoop stress is the constrictive force the clamp exerts upon the clamped object when encountering an expansion force being exerted upon the clamp by an active expansive attempt by the clamped object, such as fluid expansion within an elastomeric hose due to an increase in fluid temperature. Depending upon the hose clamp construction, these two stresses can be the same or different. Mechanical clamps typically exert a high hoop stress which results in a clamping connection with a high resistance to both blow-off and pull-off. However, mechanical clamps typically suffer from a number of disadvantages. Since such clamps are generally constructed from a strap, they have two relatively sharp edges that ring the connection end of the hose which provides an opportunity for hose damage and failure. Depending upon the metal from which the mechanical clamp is formed, it can also be susceptible to corrosion. The screw housing mechanism can also protrude from the strap thereby taking up sometimes valuable space and providing a place for objects of the environment to become entangled. Moreover, the nature of the closure mechanism generally requires a tool for operation, and sometimes valuable free space within which to operate the tool.

However, the most significant disadvantage of a mechanical clamp, at least in current automotive system applications, is its inability to resist cold fluid leaks over time. A cold leak occurs when the current system is cold and is the most prevalent and persistent type of leakage problem in modern automotive coolant systems. A common source for cold leaks is where a combination of elasticity and coefficient of thermal expansion of the clamping material is inadequate to follow the contraction of the stem or coupling insert material as both cool. After only a few heating cycles of the cooling system, the thermal expansion activity of the stem or insert and the clamp causes some of the material of the hose to flow from between the stem or insert and the clamp. This leads to an effective loosening of the clamp. Then, as the systems cools, the stem or insert shrinks away from the inner surface of the hose and the seal is broken, thereby providing a source of cold leaks.

Cold leaks are also prevalent when the hose clamp deployed exerts a non-uniform constrictive force about the circumference of the connection under the hose. Such non-uniformity also leads to leaks at times other than when the system is cold. In either event, non-uniformity can allow a separation between the stem and the hose thereby braking the seal and allowing a leak. Therefore, mechanical hose clamps also suffer from applying a non-uniform constrictive force, particularly where the housing joins the strap and at the point where the ends of the strap overlap due to both the geometry of the clamp and the relative rigidity of the material of the clamp.

In attempts to obviate the above enumerated problems associated with mechanical hose clamps, a number of polymer clamping mechanisms have been developed. In such systems, a ring of polymer material encircles a conduit or tubing joint. In some examples, this polymer material is then cross-linked to the tubing joint itself. In other instances, the polymer material is shrunk, generally by utilizing heat, to constrict it to the tubing joint. Examples of such polymer clamps are illustrated in U.S. Pat. Nos. 4,070,044; 4,366,011; 4,780,158; 4,931,116; 4,952,437; 5,071,170; 5,137,591; 5,169,176; 5,175,032; 5,228,387; 5,306,368 and U.K. Patent 2,031,106; U.K. Patent 2,1082,110; Japanese Patent 56-51324; Japanese Patent 56-75825 and Japanese Patent 58-62012.

U.S. Pat. Nos. 5,340,167; 5,531,483 and 5,566,988 are all directed toward a heat shrinkable polymer hose and tubing clamp that is designed to tightly shrink about a tubing joint when a specific diameter reducing release temperature is reached, thereby causing the clamp to immediately and tightly shrink about the tubing joint. This particular type of shrinkable polymer hose and tubing clamp is especially useful since it is self-adjusting so as to accommodate the effects of temperature and age upon hoses or tubing and stem or inserts and thus is very effective against cold leaks. This particular shrinkable polymer hose and tubing clamp is relatively flexible which allows it to both exert a uniform constrictive force and to conform to irregularities in the shape of either the hose or the stem or insert. It also provides adequate hoop stresses to prevent blow-off and pull-off of hoses associated with automotive coolant systems, is resistant to corrosion, is lightweight and is devoid of projections that waist space and can be a source for collection or debris.

While the shrinkable polymer clamps appear to obviate all of the problems previously associated with mechanical hose and tubing clamps, their installation capability has been less than satisfactory. A significant problem experienced with shrinkable polymer hose and tubing clamps is that they tend to shrink quickly, and sometimes prematurely, thereby making their installation both difficult and chancy. While the theoretical diameter reducing release temperature for heat sensitive shrinkable clamps is such that it would allow installation of the clamp about the joint prior to exposing the clamp to its diameter reducing temperature, the reality of the situation is that the diameter reducing release temperature at which heat shrinkable clamps constrict is too low for normal factory installation and operation. This situation causes premature constriction of such clamps thereby making factory installation difficult at best and eliminating any possibility of after market use for such clamps. Thus, there is a significant need for a device or system that will assist in maintaining a shrinkable hose clamp in its enlarged, pre-constriction condition and diameter so that the clamp may be mounted into its appropriate and desired position prior to its being released to constrict against the hose or tubing joint. Moreover, such a device or system cannot interfere with the ability of the shrinkable polymer clamp to tightly constrict about the hose and tubing joint while providing sufficient dynamic and static hoop stresses to resist blow-off and pull-off.

SUMMARY OF THE INVENTION

Accordingly, it is one object of the present invention to provide a device to assist in the installation of shrinkable clamps, for example for hose and tubing joints.

It is another object of the present invention to provide a device which enables the mounting and deploying of a shrinkable polymer clamp about a hose or tubing joint or connection.

Yet another object of the present invention is to provide a device which maintains a shrinkable polymer clamp in an open, non-constricted position under compression for mounting and alignment, and then enables constriction and deployment of the polymer clamp in the aligned position.

Still another object of the present invention is to provide a mounting and deploying device for shrinkable clamps that has visual indicia to indicate whether the clamp is in a constricted or an open non-constricted state.

A further object of the present invention is to provide a device and system for mounting and deploying a shrinkable clamp that is an integral unit with no disposable parts after installation of the clamp.

To achieve the foregoing and other objects and in accordance with the purpose of the present invention, as embodied and broadly described herein, a device is provided for use in easily mounting and deploying a substantially cylindrical shrinkable clamp, for example for joining a hose to a tubing. The mounting and deploying device includes a substantially cylindrical annular housing in the form of a partial substantial cylinder which has a first diameter and longitudinal opening along its surface. The longitudinal opening is defined by first and second side edges along the length of its surface, which, when at its first diameter, are circumferentially spaced apart. At least one first extension member projects circumferentially from the first side edge into the longitudinal opening, while at least a second extension member projects circumferentially from the second side edge into the longitudinal opening. The second extension member is aligned adjacent to the first extension member to define therewith, along with the partial cylinder a circumferential outer surface for the housing. A locking mechanism interacts with the first and second extension members for maintaining the relative positions of the first and second extension members, the opening along the surface of the substantially cylindrical annular housing, and thereby and the size of the first diameter of the housing, even when the housing is subjected to a radially compressive force. Finally, a triggering device is provided for disengaging the locking mechanism from one or more of the extension members to permit circumferential movement of the extension members relative to one another in response to a radial compressive force exerted on the housing to create a second, smaller diameter for the housing which is less than that of the first diameter.

As used herein, the term "substantially cylindrical" means a three dimensional shape having a continuously curved outer circumference, whether circular or oval. In addition, as used herein, "longitudinal opening" includes axial openings, openings on a bias angle, and irregular openings.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings which are incorporated in and form a part of the specification illustrate preferred embodiments of the present invention and, together with a description, serve to explain the principles thereof, and in which:

FIG. 3 is a left side perspective view, partially in phantom, of one preferred embodiment of the mounting device for a shrinkable clamp constructed in accordance with the present invention shown in its locked open mounting and positioning state having a first inner diameter, the mounting device positioned about a to-be-connected pair of tubes, the mounting device and with a shrinkable clamp, shown with parts broken away;

FIG. 4 is a left side perspective view similar to that of FIG. 3 but illustrating the mounting device for a shrinkable clamp shown in its unlocked state wherein the shrinkable clamp, shown with parts broken away, has shrunk about the device and the tubing joint;

FIG. 6 is a side perspective view of the key and triggering mechanism for the device of the present invention in its installation state;

FIG. 7 is a view similar to that of FIG. 6 but illustrating the key and triggering mechanism in its installed, non-activated position;

FIG. 8 is a side perspective view of a device and mounting mechanism constructed in accordance with the present invention;

FIG. 9 is a side view of the device illustrated in FIG. 8;

FIG. 10 is a rear view of the device illustrated in FIG. 8;

FIG. 11 is a top plan view of the device illustrated in FIG. 8;

FIG. 15 is still another embodiment of the mounting and deploying device of the present invention;

FIG. 16 is an enlarged, broken away view of a portion of the device illustrated in FIG. 15;

DETAILED DESCRIPTION OF THE PREFERRED EMBODIMENTS

Figure 1:
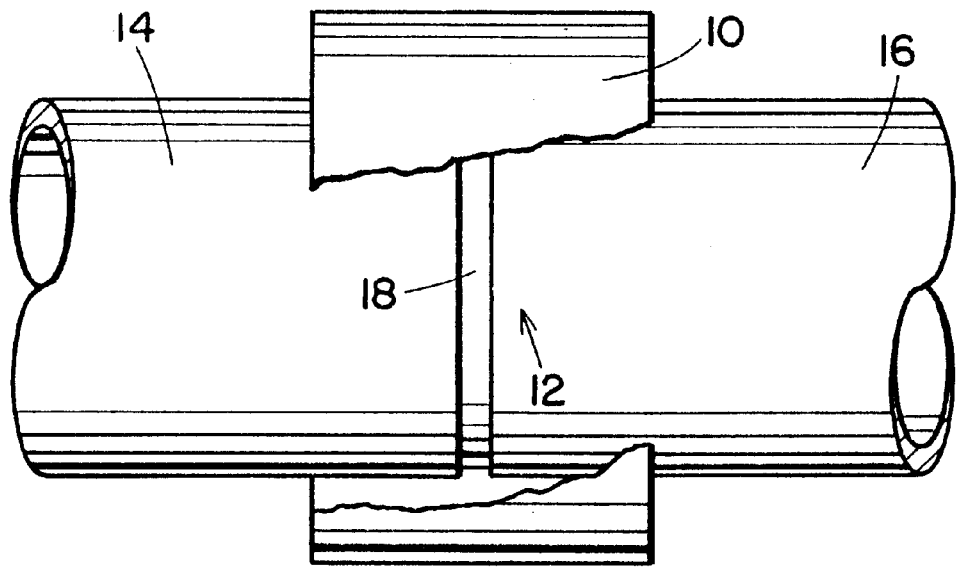
FIG. 1 is a side perspective view, with parts broken away, of a prior art shrinkable clamp in a non-constricted state positioned about a to-be-connected pair of tubes.
Figure 2:
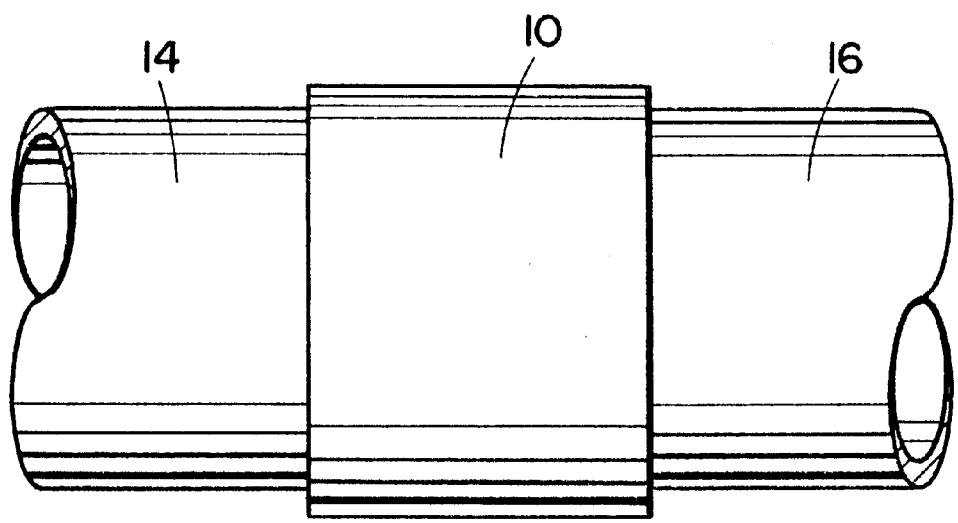
FIG. 2 is a side perspective view, similar to that of FIG. 1, of the prior art shrinkable clamp in a constricted installed state, joining a pair of tubes.

Referring first to FIGS. 1 and 2, a shrinkable polymer band 10 known in the art is positioned about a conduit or tube joint 12 which is made up of a pair of elastomeric hoses or tubes 14, 16 and an insert member 18 over which the tubes 14 and 16 are positioned. The elastomeric clamp 10 is placed over the joint 12 as illustrated in FIG. 1 and then shrunk, generally by utilizing heat, so that it compresses tightly about the joint 12 as illustrated in FIG. 2. Shrinkable polymer band clamps 10 are readily available in the art and are constructed from any number of different types of polymer materials. Generally, they are heat sensitive and thus shrink upon exposure to the appropriate elevated temperature, although they can also be cold sensitive, liquid sensitive, or the like. One particular example in illustrated in U.S. Pat. No, 5,340,167, wherein the polymer clamp is stretched to deform the polymer orientation to create an enlarged non-constricted band, which in turn is shrunk by heat exposure which reorients the polymer. In any event, the clamp 10 is positioned about the joint 12 in its expanded state and then shrunk down on the joint 12 as illustrated in FIG. 2. Unfortunately, as previously discussed, the bands 10 in their expanded state tend to shrink prematurely before they can be positioned and mounted about the joint 12. The present invention as described below is utilized with such shrinkable clamps to overcome this particular problem.

Referring now in particular to FIGS. 3 and 4, in a preferred embodiment a device 20 is provided for mounting the shrinkable clamp 10 about the junction 12 in its open positioned as illustrated in FIG. 3 and for deploying the clamp 10 about the junction 12 as illustrated in FIG. 4. The device 20 is designed to maintain the clamp 10 in its open, expanded position whether the clamp 10 is in a relaxed or a constricted state until such time as the clamp 10 is appropriately aligned over the junction 12. This is illustrated in FIG. 3. Once the clamp 10 is aligned over the junction 12, the device 20 may then be activated to allow the clamp 10 to shrink and constrict about the junction 12 as illustrated in FIG. 4.

Referring in detail to FIGS. 3–11, the device 20 includes a housing 22 preferably in the form of a sleeve or partial cylinder that is longitudinally split so as to form a longitudinal opening or gap 24. The opening 24 is defined by a pair of side edges 26 and 28 of the cylinder 22. In preferred form, the gap 24 encompasses approximately 25% of the entire circumference of the cylinder 22, or in other terms is defined by an arc of approximately 90°. The gap 24 may encompass less than 25% of the circumference of the housing 22, but is preferably at least approximately 15% in order to provide sufficient diameter reduction for use with a variety of sizes of hoses as described below. It should be noted, however, that the gap 24 may in fact preferably range from between approximately 15–92% of the circumference of the housing 22, or in other words may be defined by an arc of approximately 60° to 330°.

Figure 5:
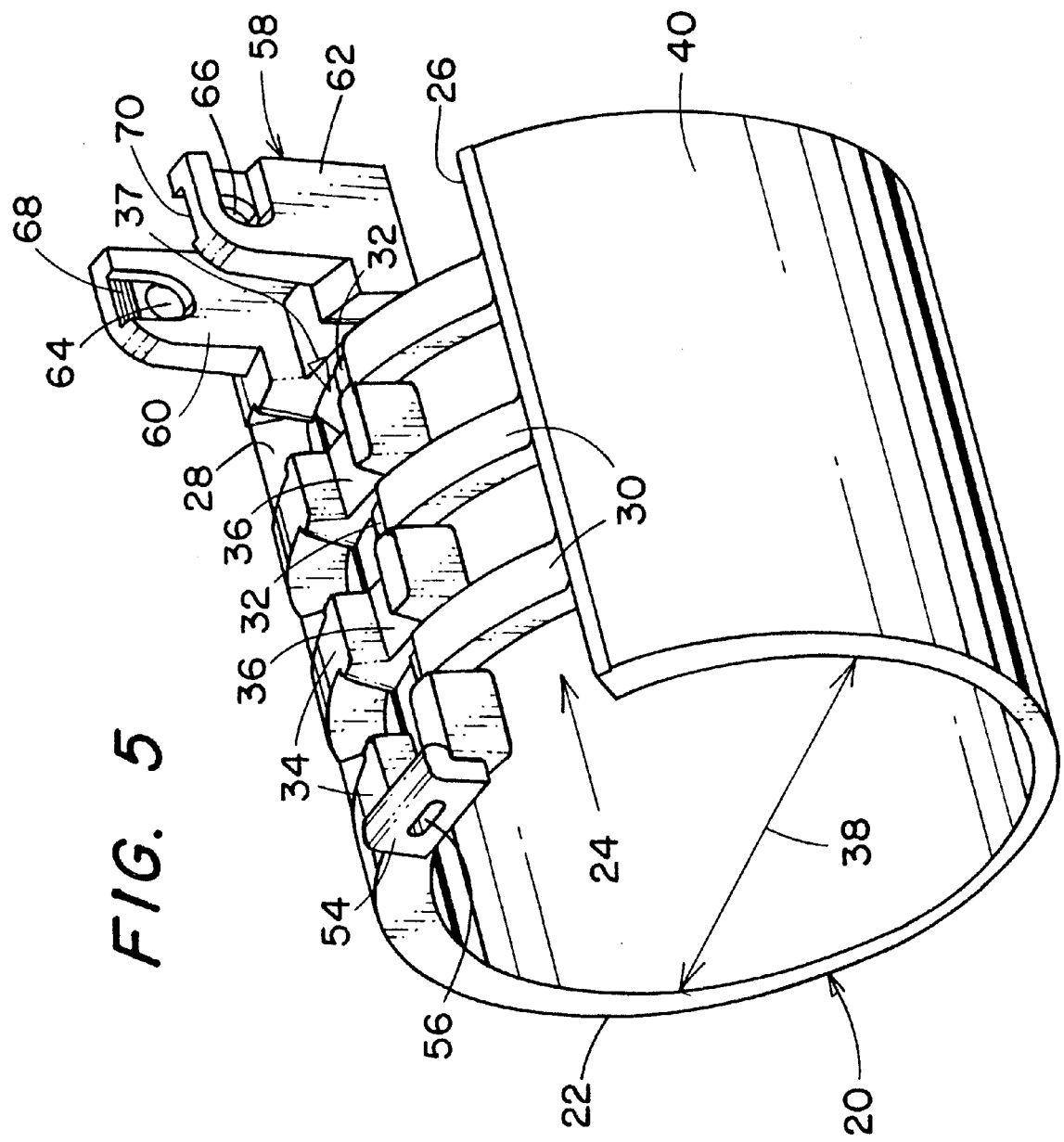
FIG. 5 is a side perspective view of the housing component constructed in accordance with the present invention.

In the preferred embodiment, a plurality of fingers 30 extend outwardly from the side edge 26 into the opening 24. In preferred form, the fingers 30 have a curvature that matches the curvature of the outer surface 40 of the housing or sleeve 22. However, the upper surfaces of the fingers 30 are positioned radially less than the outer surface 40 to enable them to easily fit through the apertures 50 of the key member 44 as described in greater detail below. A notch 32 is preferably cut into the distal end of each finger 30. Likewise, a plurality of fingers 34 extend outwardly from the second side edge 28 into the longitudinal opening 24 and include a curvature that approximates the curvature of the housing 22. Each finger 34 includes a notch 36 that is formed toward the distal end thereof but in a manner to form a channel notch in the finger 34. The fingers 30 are arranged so as to dovetail between the fingers 34 in such a manner so as to align the notches 32 with the notches 36 to form a longitudinal channel 37 for receiving a locking key member as described below. When the housing 22 is in its open, unstressed condition as illustrated in FIG. 5, the notches 32 and 36 normally aligned themselves with each other, the housing 22 defining a first diameter 38. Moreover, the housing 22 in conjunction with the fingers 30 and 34 form an outer surface 40 which is adapted to receive a shrinkable polymer clamp 10 in its open, unstressed position as illustrated in FIG. 3.

A locking mechanism 42 is provided to maintain the relative positions of the fingers 30 and 34 as illustrated in FIGS. 3 and 5 even after the clamp 10 is activated to shrink by realigning its polymer material, thereby creating radial compressive forces against the outer surface 40 of the housing 22. In this manner, the clamp 10 mounting on the device 20 can be positioned at any desired location even though it has already been subjected to its diameter reducing release temperature so as to initiate the shrinking process. In more detail and with particular reference to FIGS. 3, 4 and 6–11, the locking mechanism 42 includes a key member 44 that is in the form of an elongated strip 46 having a smooth upper surface and a keyed lower surface in the form of a plurality of teeth 48 which are spaced from each other by a plurality of grooves 50. The elongated strip 46 includes a distal end in the form of a tongue 52 that projects outwardly therefrom and may be color coded to provide visual indicia as described below. The key member 44 is sized and shaped so as to snugly fit within the channel 37 defined by the notches 32 and 36.

A mounting mechanism for the key member 44 includes an end mounting bracket 54 disposed on one end of the housing 22 along the gap 24. The bracket 54 includes a slot 56 which is sized and shaped to receive the tongue 52 of the key member 44. Disposed at the opposite end of the housing 22 proximate the longitudinal gap 24 is a pivot bracket 58 which includes a pair of flanges 60 and 62. Flanges 60 and 62 include apertures 64 and 66, respectively. The flange 60 includes a chamfered surface 68 at the upper end thereof which leads to the aperture 64. Likewise, the flange 62 includes a chamfered surface 70 which leads to the aperture 66. The chamfered surfaces 68 and 70 are provided to assist in mounting a trigger mechanism as described below.

A trigger mechanism 72 is provided in the form of trigger member 74 having a distal end 76 and an enlarged mounting end 78 which includes a pair of shafts 80 and 82 projecting outwardly from the sides of the mounting end 78. The mounting end 78 is secured by a cam member 84 to the end of the key member 44. The shafts 80 and 82 are sized and shaped to firmly lock within the apertures 64 and 66 of the flanges 60 and 62. To place the key member 44 within the channel 37, the key member 44 is positioned as illustrated in FIG. 6 so that the tongue 52 is inserted within the slot 56 of the bracket 54. The shafts 80 and 82 are then placed against the chamfered surfaces 68 and 70 and pressed downwardly as the distal end 76 is rotated upwardly so as to be in the position illustrated in FIG. 7. As the shafts 80 and 82 are pressed downwardly against the chamfered surfaces 68 and 70, the brackets 60 and 62 are spread a sufficient amount so that the shafts 80 and 82 snap-fit within the apertures 64 and 66, thereby positioning the key member 44 and the trigger member 72 as illustrated in FIGS. 3–4 and 8–11.

When the key member 44 and the trigger mechanism 72 are positioned in the manner described above as illustrated in FIGS. 3–4 and 8–11, the distal end 76 of the trigger finger 74 is pointed upwardly away from the surface 40 of the housing 22. In this orientation, the key member 44 is in its locking position wherein the teeth 48 are firmly disposed within the notches 32 of the fingers 30. Thus, when the shrink clamp 10 is positioned about the outer surface 40 and then constricted to apply a radially compressive force against the outer surface 40, the teeth 48 block the fingers 30 from moving relative to the fingers 34 and the rest of the housing 22. In this manner, the device 20 is maintained in a locked and open position to enable an installer to place the housing 22 in an appropriate position such as illustrated in FIG. 3. Once the device 20 with the clamp 10 is placed in position and the installer chooses to activate the clamp 10, the trigger finger 74 is pressed downwardly toward the outer surface 40 as illustrated in FIG. 4. This movement of the trigger finger 74 moves the key member 44 longitudinally within the channel 37 until the teeth 48 engage the notches 36 of the second fingers 34. When this occurs, the first fingers 30 are then aligned with the channels 50 of the key member 44 which enables the fingers 30 to move through the channels 50 and thereby reduce the diameter of the housing 22 to its second, smaller diameter as illustrated in FIG. 4 by the numeral 84. When this action occurs, the compressive force from the clamp 10 presses against the housing 22 until the clamp 10 is tightly fitted about the junction 12. When this occurs, the tongue 52 of the key member 44 is withdrawn from the socket 56 and is no longer in full exterior view. In preferred form, the tongue 52 is color coded differently from the remainder of the housing 22 as a visual indicia as to whether the device 20 is in its open locked position as indicated in FIG. 3, wherein the tongue 52 is viewable outside of the bracket 54, or in its unlocked and compressed state as illustrated in FIG. 4, wherein the tongue 52 is no longer visible. Moreover, the position of the distal end 76 of the trigger finger 74 is also an indicia as to the condition of the device 20.

The device 20 is preferably made from a plastic material which has sufficient strength to withstand the compressive force of the activated clamp 10 when the device 20 in its open and locked position. However, it must be sufficiently soft so as to not interfere with the clamping capability of the shrinkable polymer clamp 10. In addition to plastic, the device 10 may also be constructed from other materials which enable it to function as described above, such as aluminum, lightweight ceramics and the like. It should be noted that the open, unstressed state of the device 20 provides a first diameter 38 as illustrated in FIGS. 3 and 5. This diameter of the device 20 may be reduced to its smallest size when the ends of the first fingers 30 strike the second side surface 28 and/or the ends of the fingers 34 strike the first side edge 26. However, the device 20 is sized in such a manner so that this theoretical minimum diameter will never be achieved inasmuch as the elastomeric hoses 14 and 16 will prevent reaching this minimum diameter size. Thus, the second or smaller diameter 84 is achieved when the device 20 has been compressed about the houses 14 and 16 as a result of the radial compressive force exerted by the shrinkable clamp member 10 when the device 20 is in its unlocked state as illustrated in FIG. 4.

As a result of the construction of the device 20, there are no overlapping components in the device 20 as its diameter is reduced due to compressive force exerted by a shrinkable clamp 10 positioned thereon. This fact is quite important since overlapping components tend to provide leak paths, particularly cold leak paths, as discussed above concerning the mechanical clamps of the prior art. In preferred form, the device 20 is made from a nylon based plastic and is designed so that when it is unlocked and activated as illustrated in FIG. 4, there are no component parts that fall off or are removed. This is particularly important in a factory production line environment.

As previously discussed, the opening 24 preferably varies from between 15% to 92% of the entire circumference of the device 20, or in other terms is defined by an arc of between 60° to 330°. If the longitudinal opening or gap 24 is too small, there will not be enough movement afforded between the fingers 30 and 34 to enable the shrinkable clamp 10 to produce maximum compressive force in a variety of installation environments. Moreover, if the gap 24 is too small in width, the device 20 will be very limited as to the diameter of hoses 14 and 16 with which it is capable of being utilized. On the other hand, if the width of the longitudinal gap 24 is too large, the compressive force from the shrinkable clamp 10 could crush or crack the fingers 30 and 34 when the clamp 10 has been shrink activated around the device 20 when it is in its locked condition as illustrated in FIG. 3. Obviously, this factor is also somewhat dependent on the strength of the material selected for the device 20 in conjunction with the size of the gap 24.

Figure 12:
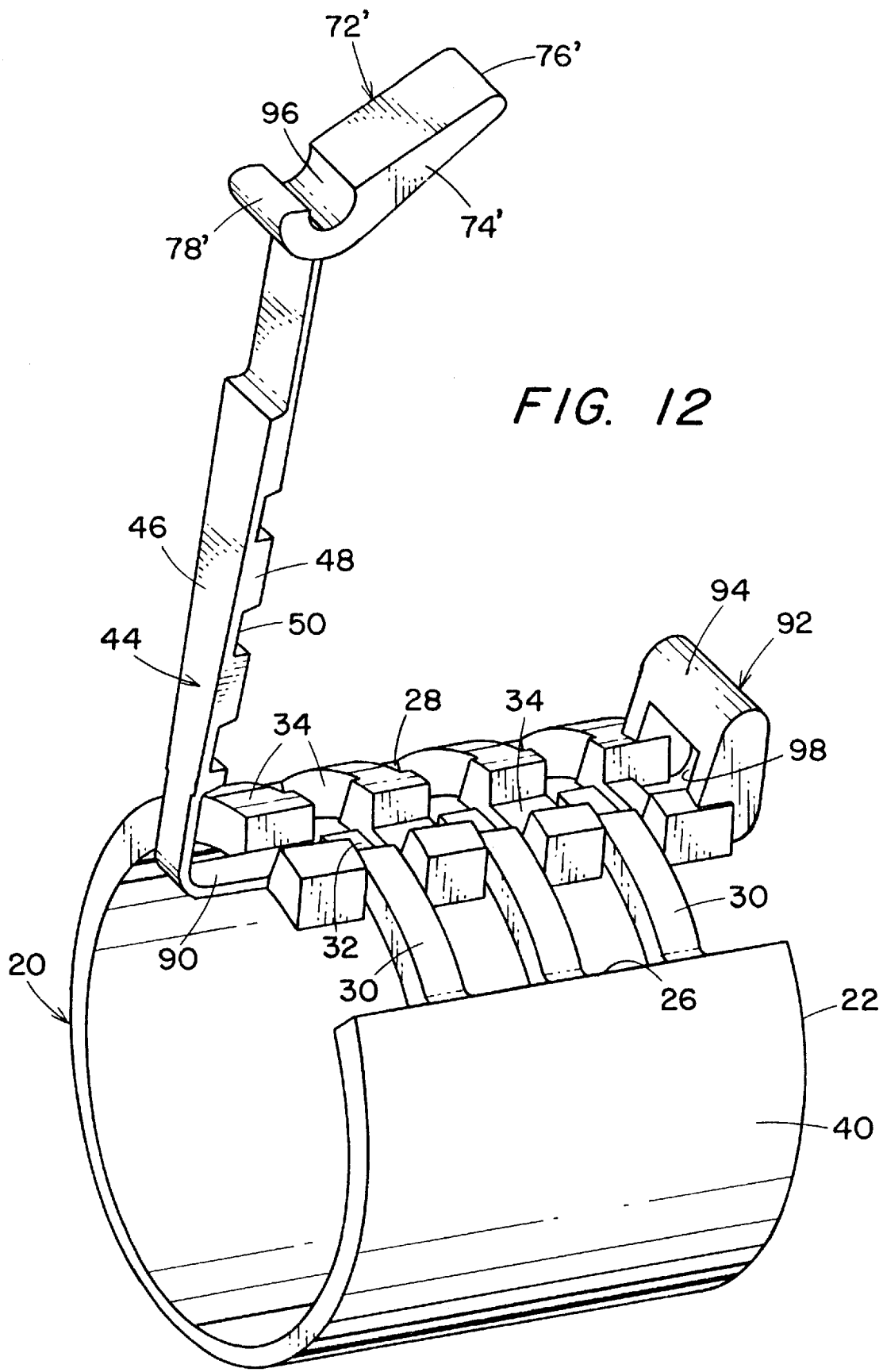
FIG. 12 is a perspective view of another embodiment of the mounting and deploying device of the present invention.

Referring now to FIG. 12, an alternate embodiment for the device 20 is illustrated wherein the housing 22 and finger structures 30 and 34 are the same as in the prior embodiment. However, in this instance the key member 44 does not include an end tongue 52, but rather has its distal end in the form of a connection strap 90 which is secured to the outermost finger 34 at the bottom of its notch 36. In this manner, the key member 44 cannot inadvertently be lost and is molded as an integral unit with the housing 22. Moreover, the trigger mechanism 72' is somewhat different and includes a trigger arm 74' having a distal end 76' and a connection end 78'. A bracket 92 is disposed opposite from the connection strap 90 and is in the form of a camming surface 94. The connecting end 78' of the trigger arm 74' includes a notch 96 which is sized and shaped to move about the cam surface 94. Thus, the distal end 76' is positioned through the opening 98 of the bracket 92 and is then moved upwardly to its upward locked position similar to that of FIG. 3. When it is desired to activate the key member 44 and unlock it so as to permit movement of the fingers 30 relative to the fingers 34, the trigger arm 74' is moved downwardly toward the outer surface 40 of the housing 22 as in the prior embodiment illustrated in FIG. 4.

Figure 13:
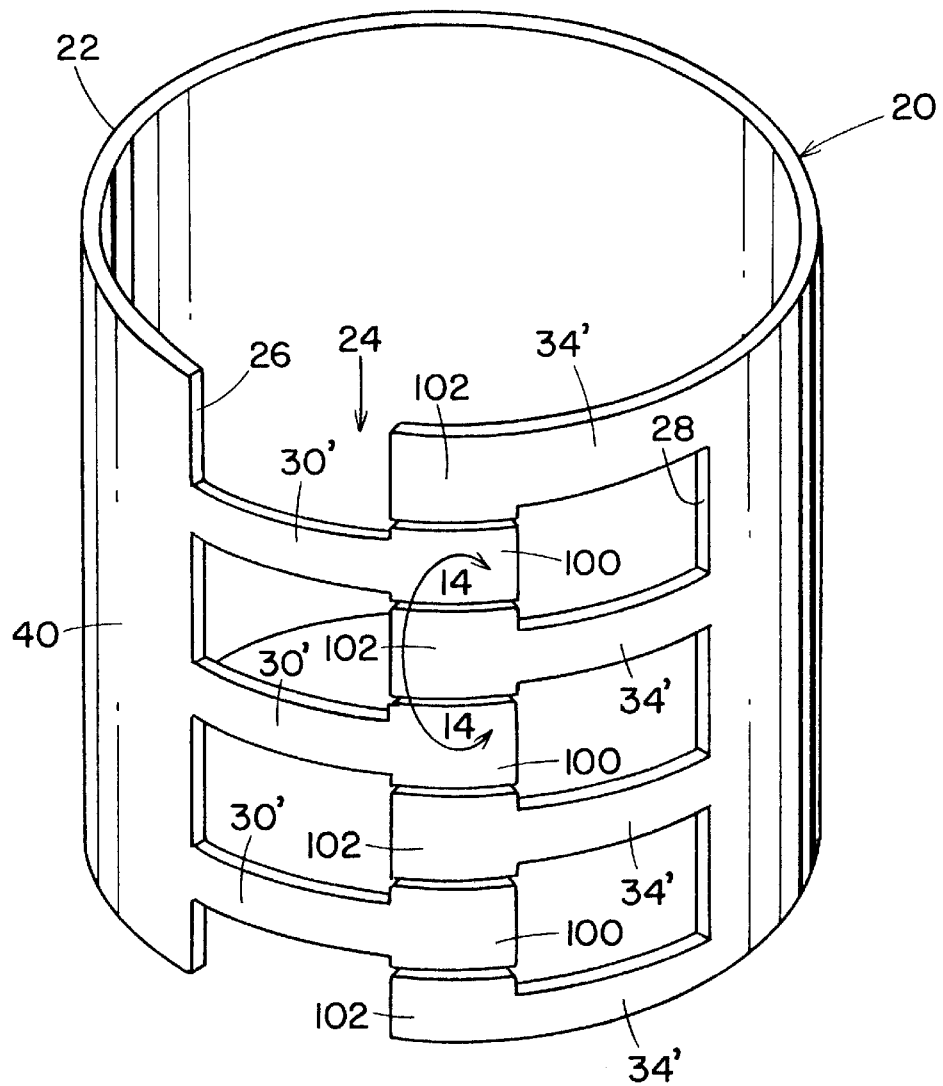
FIG. 13 is a perspective view of yet another embodiment of the mounting and deploying device of the present invention.
Figure 14:
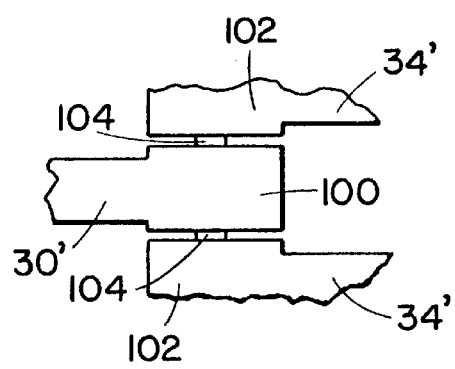
FIG. 14 is an enlarged broken away view of a portion of the device illustrated in FIG. 13.

Referring now to FIGS. 13 and 14, still another embodiment of the present invention is illustrated herein. In this embodiment, there are no notches 32 or 36 in the fingers as previously illustrated. Instead, a housing 22 includes a set of fingers 30' projecting from a first side edge 26, and a set of fingers 34' projecting from the opposite second side edge 28. In this instance, however, each finger 30' includes a distal head element 100 while each finger 34' includes a distal head element 102. The fingers 30' and 34' are sized and shaped so that their respective distal head elements 100 and 102 are longitudinally aligned next to each other, with the fingers 30' dovetailing between the fingers 34' as in the prior embodiments. In this instance, however, each distal head element 100 is secured to its adjacent distal heads 102 on either side thereof by a connection tab 104 so that the distal head elements 100 and 102 are longitudinally aligned and interconnected. The connection tabs 104 are sufficiently strong so that when a shrinkable clamp member 10 is positioned about the surface 40 of the housing 22 and then activated so as to apply a compressive force to the surface 40 of the housing 22, the connection tabs 104 will maintain the relative aligned positions of the distal heads 100 and 102. Once the device 20 is placed in position about a tubular junction 12, and it is desired to activate the device 20 and allow the properly positioned clamp 10 to be compressed about the junction 12, a force is exerted against the distal heads 100 and 102 exterior to the housing 22 and the clamp 10 surrounding the housing 22. This force is uniformly applied along the entire length of the interconnected distal heads 100 and 102 and is of sufficient force so as to separate and break the connection tabs 104 thereby allowing the fingers 30' and the fingers 34' to move circumferentially relative to each other toward their respective opposite side surfaces 28 and 26 and thereby reduce the diameter of the housing 22.

Referring now to FIGS. 15 and 16, a slight variation to the embodiment illustrated in FIGS. 13 and 14 above is provided. In this instance, the structure of the device 20 and housing 22 is the same in that fingers 30' and 34' each terminate in distal heads 100 and 102. However, instead of having connection flanges between the distal heads 100 and 102, each of the distal heads 100 and 102 has a longitudinal aperture passing through the width thereof in a position so as to align these apertures when the heads 100 and 102 are in alignment as illustrated in FIGS. 15 and 16. A connection pin 106 is then inserted through each of the apertures so as to pass through the entire aligned series of distal heads 100 and 102 and is of sufficient strength so that when a radial compressive force is exerted against the housing 22 by a shrinkable clamp positioned thereon, the heads 100 and 102 are retained in their longitudinally aligned position. When it is desired to activate the device 20 and allow the shrinkable clamp thereon to clamp down on a hose junction 12 or the like, the pin 106 is quickly removed so as to free the fingers 30' and 34' to move circumferentially relative to each other toward their respective opposite side edges 28 and 26 in response to the radial compressive force from a surrounding shrinkable polymer clamp. In this particular example, however, the resultant pin 106 must then be discarded.

Figure 17:
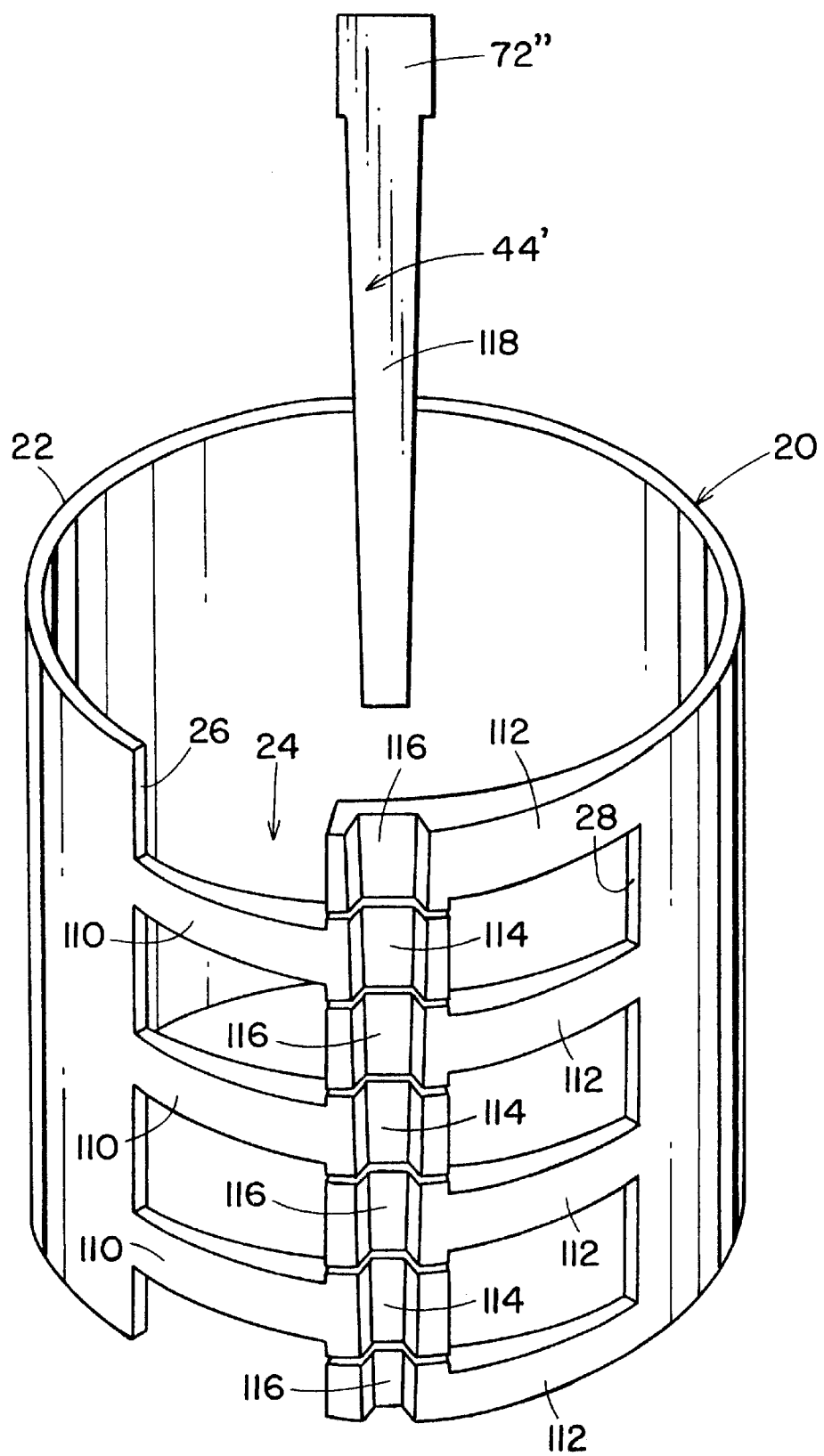
FIG. 17 is yet another embodiment of a device and mounting mechanism constructed in accordance with the present invention.

Referring to FIG. 17, another embodiment of the device 20 of the present invention is illustrated and includes a housing 22 having a longitudinal opening or gap 24 which is defined by longitudinal side edges 26 and 28 as in the previous embodiments. In this particular embodiment, a plurality of fingers 110 project outwardly and circumferentially away from the first side edge 26 while a plurality of fingers 112 likewise project outwardly and circumferentially away from the second side edge 28 as in the previous embodiment. However, in this embodiment each finger 110 includes a notch 114 positioned toward the distal end of the fingers 110 and in the form of a cross-wise channel to the length of the fingers 110. Likewise, the fingers 112 include notches 116 positioned toward the distal ends thereof in the form of a cross-wise notch relative to the length of the fingers 112. The fingers 110 and 112 and the notches 114 and 116 are sized and shaped so that the notches 114 and 116 are in longitudinal alignment when the device 20 is in its unstressed, open position. Moreover, in a preferred form of this embodiment, the notches 114 and 116 are sized in sequentially smaller sizes so as to form a tapered line when the notches 114 and 116 are aligned. The key member 44' includes an elongated strip 118 that is in a tapered form to match the taper of the aligned notches 114 and 116. The strip 118 is sized and shaped so as to snugly fit within the notches 114 and 116 when the housing 22 is in its unstressed, open condition. A trigger member 72' is secured to one end of the key member 44' in the form of a pull-tab which projects outwardly from the housing 22. When a shrinkable clamp is positioned about the housing 22, the key member 44' is already in position within the notches 116 and 114. The key member 44' prevents the fingers 110 and 112 from moving circumferentially relative to each other when a shrinkable polymer clamp is activated to exert a radially compressive force on the housing 22. Once the device 20 is positioned in the desired location, the key member 44' is removed from the notches 114 and 116 by simply pulling on the trigger 72' and removing the key member 44' from the notches 114 and 116. When this occurs, of course, the fingers 110 and 112 then move circumferentially relative to each to collapse the shell 22 and reduce its diameter as in the prior embodiments.

Figure 18:
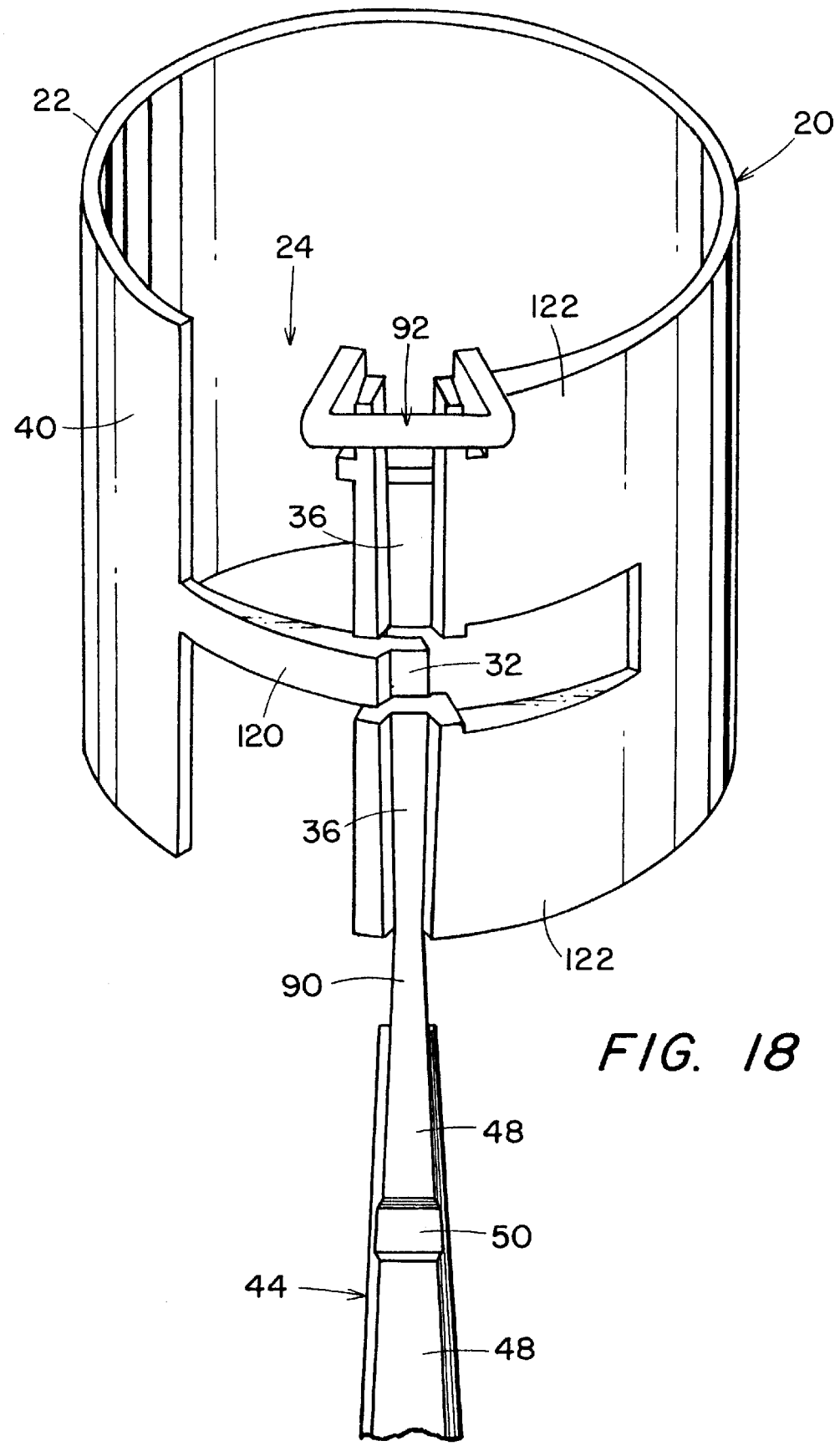
FIG. 18 is a further embodiment of a device and mounting mechanism constructed in accordance with the present invention.
Figure 19:
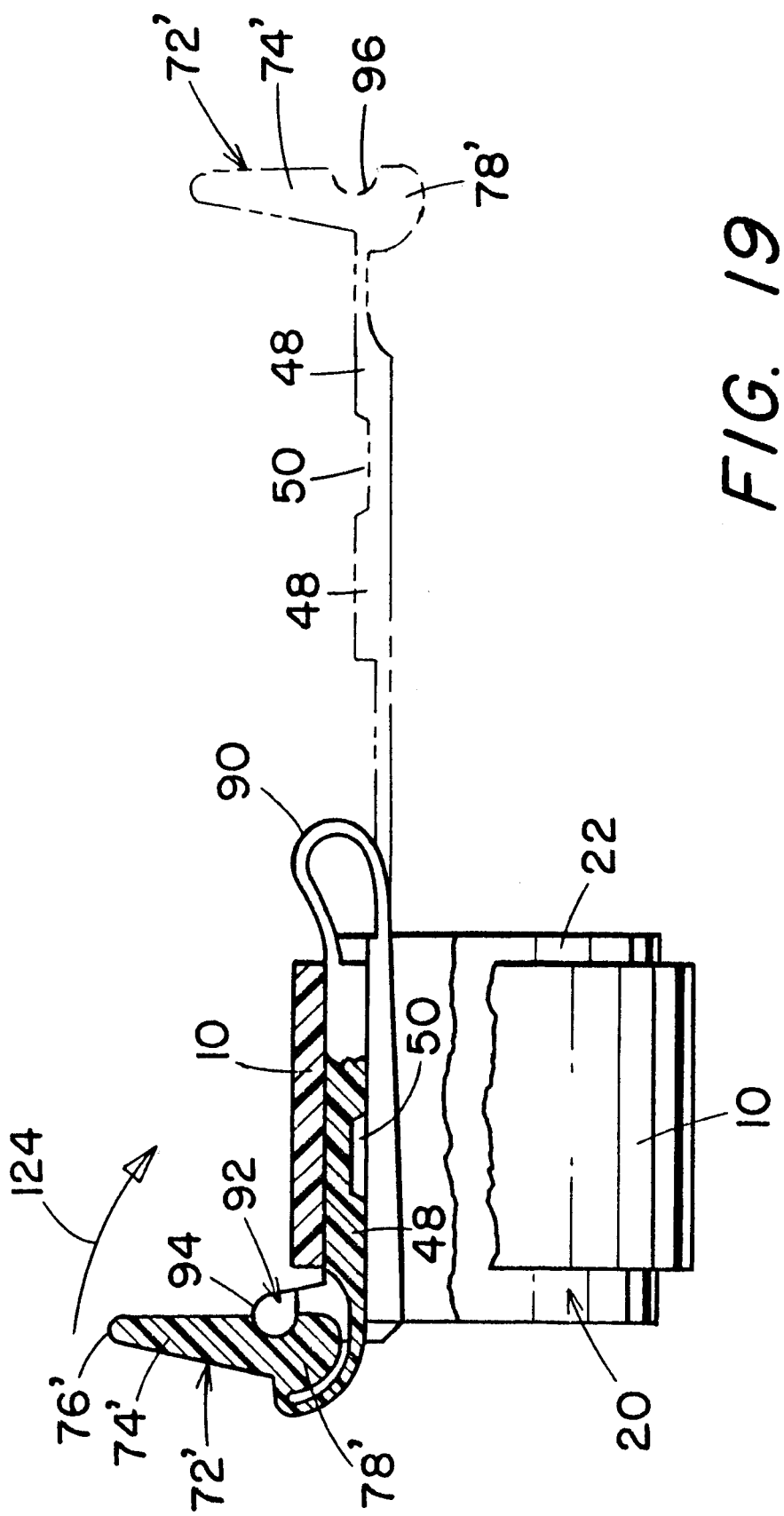
FIG. 19 is side perspective view, with some parts in shadow, of the device illustrated in FIG. 18.

FIGS. 18 and 19 disclose still another embodiment of the present invention which includes a housing 22 having a longitudinal opening 24 defined by side edges 26 and 28. In this instance, there is only one first finger 120 and two large second fingers 122, each projecting circumferentially outwardly from their respective side edges 26 and 28. In this instance, the single finger 120 is substantially identical to the fingers 30 of the embodiments of FIGS. 3–11 and includes a distal notch 32. Likewise, the enlarged fingers 122 are similar to the prior second fingers 34 except that they are substantially wider, each including a notch 36 toward its distal end thereof in the form of a channel. The key member 44 of this embodiment is similar to that illustrated in FIG. 12 in that it includes a connection strip 90 so that the key member 44 is an integral part of the housing 22. In this instance, however, the key member 44 only has two tooth profiles 48 spaced by a single gap or channel 50 since there is only one first finger 120. The trigger mechanism of this embodiment is similar to that illustrated in FIG. 12 and includes an end bracket 92 having a camming surface 94. The trigger arm 74' includes a distal end 76' and mounting end 78' which includes a cam notch 96 for engagement with the camming surface 94 of the bracket 92. When the trigger arm 74' is activated by movement along the arrow 124, one of the teeth 48 is disengaged from the notch 32 which enables the first finger 120 to move circumferentially through the channel 50 relative to the fingers 122 and into the gap therebetween. This is, of course, in response to a radially compressive force exerted by a shrinkable clamp placed about the housing 22 similar to the prior embodiments.

Figure 20:
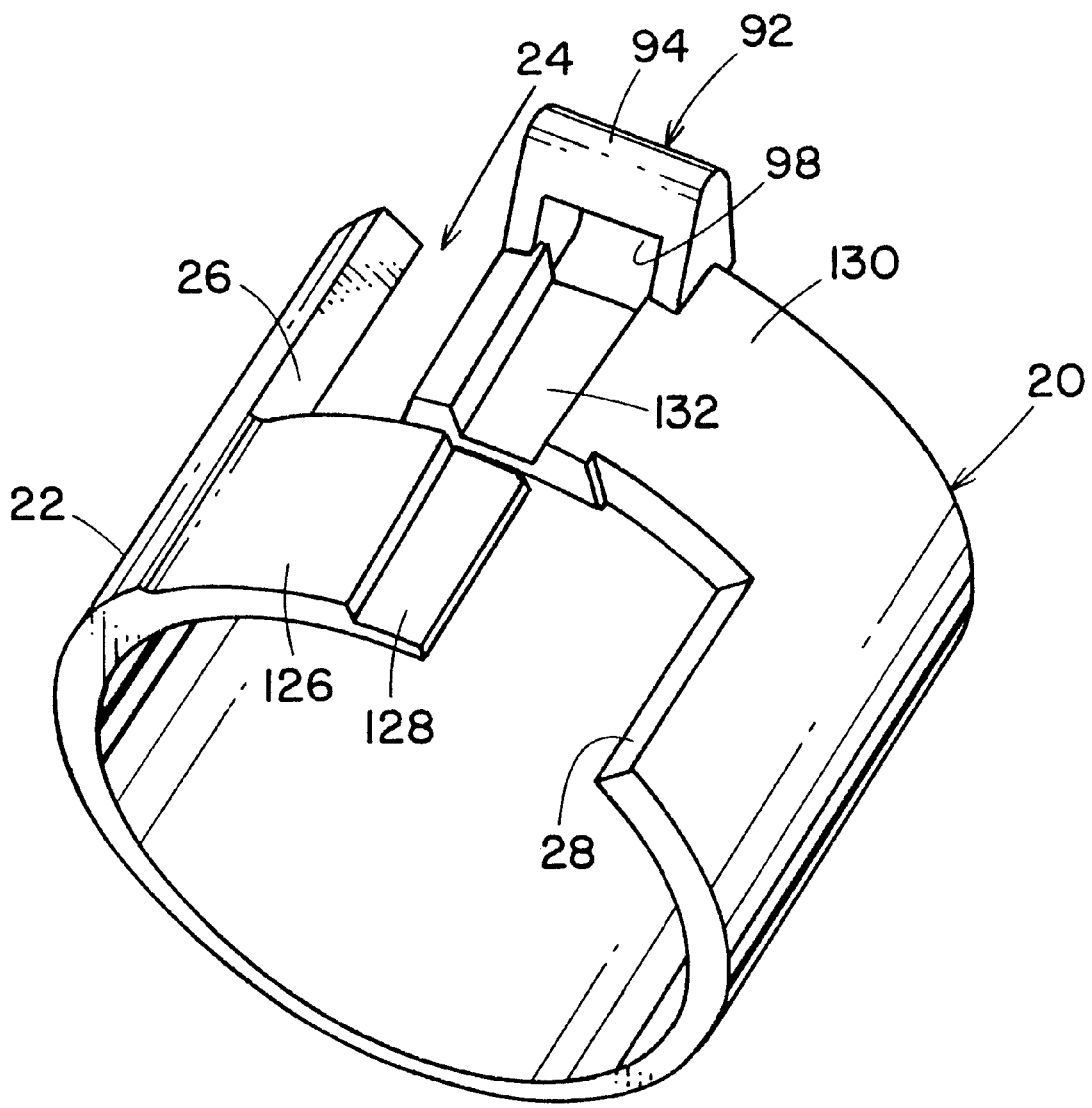
FIG. 20 is still another embodiment of a mounting and deploying device constructed in accordance with the present invention.

The final embodiment of the present invention is illustrated in FIG. 20 and shows the housing 22 having a single finger extension 126 with a notch 128 at the distal end thereof, the first finger 126 projecting from the first side edge 26 of the longitudinal gap opening 24. Likewise, this embodiment only has a single second finger 130 which projects from its longitudinal side edge 28. The second finger 130 includes a notch 132 toward the distal end thereof in the form of a channel. A key member 44 similar to that illustrated in FIGS. 18 and 19 may be utilized with the housing 22 illustrated in FIG. 20 but having a single tooth 48 sufficiently large so as to overlap into both of the notches 128 and 132, thereby preventing the fingers 126 and 130 from moving circumferentially relative to each other when in an initial compressed state in its open position. When it is desired to activate the device having a housing 22 as illustrated in FIG. 20, the key member 44 is moved similar to that illustrated in FIG. 19 so as to disengage the tooth 48 from the gap 128 and move it entirely into the notch 132 so as to permit the fingers 126 and 130 to move circumferentially relative to each other thereby reducing the size of the diameter of the housing 22 in response to a radially compressive force.

As can be seen from the above, the present invention provides a unique device and system for enabling easy installation and deployment of shrinkable polymer clamps. The present invention clearly overcomes the problems of premature activation and shrinkage of such clamps so as to allow the clamps to be easily positioned before the clamps are released to compress a hose and tubing junction. Moreover, the device of the present invention will enable a shrinkable clamp to be placed thereon and then be stored for after-market applications, even though the shrinkable clamp may have been activated so as to be in a compressive mode as opposed to a non-compressive mode when initially formed. Thus, all of the problems associated with the installation and deployment of such shrinkable clamps, and in particular heat sensitive shrinkable clamps, are obviated by the device of the present invention. Moreover, the device of the present invention does not interfere with the shrinkable polymer hose and tubing clamp function so as to permit such shrinkable clamps to be self-adjusting and flexible yet allow them to exert a uniform constrictive force and conform to irregularities in the shape of either the hose or a stem or insert. Moreover, while the device of the present invention is a mechanical type of device, it has no parts which overlap or bind either the hose or the polymer clamp material, thereby eliminating cold leaks. Finally, the device of the present invention allows shrinkable clamps to provide adequate dynamic and static hoop stresses to prevent leakage, blow-off and pull-off of hoses, particularly those associated with automotive cooling systems. The present invention is easy to manufacture and simple to utilize and does not have any throw-away components, in its preferred form, which would tend to clutter factory floors in production line environments.

The foregoing description and the illustrative embodiments of the present invention have been described in detail in varying modifications and alternate embodiments. It should be understood, however, that the foregoing description of the present invention is exemplary only, and that the scope of the present invention is to be limited to the claims as interpreted in view of the prior art. Moreover, the invention illustratively disclosed herein suitably may be practiced in the absence of any element which is not specifically disclosed herein.

We claim:

1. A device for mounting and deploying a shrinkable, substantially cylindrical clamp, said device comprising:

an annular housing in the form of a partial substantial cylinder having a first diameter and a longitudinal opening defined along its length by first and second circumferentially spaced longitudinal side edges;

at least one first extension means projecting from said first side edge into said longitudinal opening;

at least one second extension means projecting from said second side edge into said longitudinal opening, said first and second extension means defining therewith, along with said partial substantial cylinder a circumferential outer surface for said housing;

lock means interacting with said extension means for maintaining the relative positions of said first and second extension means and said first diameter of said partial substantial cylinder housing, even when said housing is subjected to a radially compressive force; and trigger means for disengaging said lock means from said extension means to permit circumferential movement of said extension means relative to one another when said partial substantial cylinder housing is subjected to a radial compressive force, to thereby compress said partial substantial cylindrical housing and create a second, smaller diameter for said housing which is less than said first diameter.

2. The device as claimed in claim 1, wherein said first and second extension means are aligned adjacent one another, and each comprises at least one projection member initially extending into said longitudinal opening.

3. The device as claimed in claim 2, wherein said first extension means comprises two spaced apart finger members projecting into said longitudinal opening of said partial substantial cylindrical housing from said first side edge, while said second extension means comprises one finger member projecting into said longitudinal opening from said second side edge aligned between said two spaced apart oppositely disposed finger members from said first side edge.

4. The device as claimed in claim 1, wherein each said first and second extension means comprises a plurality of spaced apart finger members projecting into said longitudinal opening, the finger members of said first extension means being aligned alternately within the spaces between said finger members of said second extension means.

5. The device as claimed in claim 4, wherein each said finger member includes a notch disposed therein, said notches of said finger members being longitudinally aligned when said housing is in a non-compressed state, and wherein said lock means comprises an elongated key member disposed longitudinally across said finger members and releasably engaged within said notches to prevent circumferential movement of said finger means relative to said key member and each other when said housing is subjected to a radially compressive force.

6. The device as claimed in claim 5, wherein said key member includes a plurality of spaced-apart teeth alternating with grooves that are sized and shaped such that said teeth engage the notches of said second extension finger members while said grooves are aligned with the notches of said first extension finger members so as to prevent circumferential movement of said second extension finger members when said housing is in its mounting position, said teeth disengaging from the notches of said second extension finger members when said key member is moved longitudinally so as to permit the second extension finger members to engage said grooves and permit circumferential movement of said second extension finger members relative to said first extension finger members in response to radial compressive force on said housing, and wherein said trigger means comprises an activation member secured to selectively move said key member longitudinally to disengage said key member teeth from the notches of said second extension finger members.

7. The device as claimed in claim 1, wherein each said first and second extension means includes at least one member having a notch disposed therein, said notches being longitudinally aligned when said partial substantial cylindrical housing is at its first diameter, and wherein said lock means comprises an elongated key member disposed longitudinally across said first and second extension means members and releasably engaged with said notch to prevent circumferential movement of said extension means relative to said key member and relative to each other when said housing is subjected to a radially compressive force.

8. The device as claimed in claim 7, wherein said trigger means comprises an activation member secured to selectively move said key member to disengage said key member from said notches in a manner to free said second extension means to move substantially circumferentially relative to said first extension means in response to a radially compressive force on said housing.

9. The device as claimed in claim 8, wherein said key member includes at least one tooth member aligned to engage said notch of said second extension means member to prevent circumferential movement of said second extension means member, and to disengage said notch when said key member is moved by said activation member to permit circumferential movement of said extension means member in response to a radially compressive force on said housing.

10. The device as claimed in claim 8, wherein said activation member comprises a mounting bracket secured to said housing, a lever secured to one end of said key member, and pivot means securing said lever to said mounting bracket such that movement of said lever about said pivot means creates longitudinal movement of said key member to thereby allow radially compressive force on said housing.

11. The device as claimed in claim 1, wherein a shrinkable clamp is disposed about said housing.

12. A retainer device for positioning and installing a shrinkable hose and tubing clamp, said retainer device comprising:
   a collar having a gap defined by first and second longitudinal side edges;
   first finger extensions projecting from said first side edge into said longitudinal gap and spaced from said second side edge;
   at least one second finger extension projecting from said second side edge into said longitudinal gap for alignment between a pair of said first finger extensions and spaced from said first side edge to define along with said first finger extensions a circumferential outer surface for said collar adapted to receive a shrinkable clamp, said collar having a first diameter defined when said collar is in a non-compressed state;
   lock means interacting with said first and second finger extensions for maintaining the relative positions of said first and second finger extensions and the dimension of said housing first diameter when said collar is subjected to a radially compressive force from an activated shrinkable clamp disposed thereon; and
   trigger means for selectively disengaging said lock means from said second finger extension to permit circumferential movement of said first and second finger extensions toward their opposite side edges without contacting the same in response to a radially compressive force from an activated shrinkable clamp disposed about said collar to reduce the diameter of said collar to a second, smaller diameter.

13. The retainer device as claimed in claim 12, wherein said device includes a plurality of said first finger extensions and a plurality of second finger extensions dovetailed with each other to form alternating first and second finger extensions longitudinally along said gap.

14. The retainer device as claimed in claim 13, wherein each of said plurality of first and second finger extensions includes a notch disposed proximate the distal end thereof, said notches being aligned longitudinally when said housing is in a non-compressed condition, and wherein said lock means comprises an elongated key member having a plurality of teeth alternating with grooves, said key member being disposed longitudinally across said first and second finger extensions to engage said teeth within the notches of said second finger extensions to prevent circumferential movement of said second finger extensions relative to said key member and said first finger extensions when said collar is subjected to a radially compressive force.

15. The retainer device as claimed in claim 14, wherein said trigger means comprises a mounting bracket secured to one end of said collar, an activation lever secured to one end of said key member, and pivot means securing said activation lever to said mounting bracket wherein movement of said activation lever moves said key member longitudinally to disengage said key member teeth from the notches of said second finger extensions in a manner to free said second finger extensions to move circumferentially relative to said first finger extensions in response to a radially compressive force on said collar.

16. The retainer device as claimed in claim 15, wherein said activation lever is aligned angularly upwardly from said collar when said key member teeth engage the notches of said second finger extensions, and wherein movement of said activation lever downwardly toward the circumferential surface of said collar disengages said key member teeth from said second finger extension notches to permit circumferential movement of said second finger extensions and reduction of the size of said collar diameter to said second, smaller diameter.

17. The retainer device as claimed in claim 16, wherein the distal end of said key member includes a tongue, and wherein said housing includes a second mounting bracket having a central aperture for receiving said key member tongue such that said tongue projects through said aperture outwardly beyond said second mounting bracket when said activation lever is in its upwardly oriented position, and wherein said tongue withdraws into said second mounting bracket when said activation lever is moved downwardly toward said collar.

18. The retainer device as claimed in claim 12, wherein said longitudinal gap comprises at least 15% of the circumference of said collar.

19. The retainer device as claimed in claim 18, wherein the arc of said longitudinal gap ranges between approximately 60° to 330°.

20. The device as claimed in claim 12, wherein a shrinkable clamp is disposed about said housing.

21. An installation device for a temperature sensitive shrinkable elastomeric hose and tubing clamp, said device comprising:

a housing in the form of a partial cylindrical sleeve having a longitudinal opening bounded by first and second side edges, said housing having a first diameter defined by said housing in a non-compressed state;

a plurality of first fingers extending circumferentially from said first side edge into said longitudinal opening spaced from said second side edge;

a plurality of second fingers extending circumferentially from said second side edge into said longitudinal opening spaced from said first side edge and juxtaposed in alternating fashion between said plurality of first fingers to define with said sleeve a circumferential surface for said housing which is adapted to receive a temperature sensitive shrinkable clamp having a diameter reducing release temperature;

locking means for maintaining the relative positions of said first and second fingers and the sized of said first housing diameter when said housing is subjected to a radially compressive force from a temperature sensitive shrinkable clamp which has achieved its diameter reducing release temperature, said locking means including an elongated key member disposed longitudinally across and interlocking with said first and second fingers; and a trigger device for selectively disengaging said key member from said second fingers to permit circumferential movement of said first and second fingers relative to each other toward their opposite side edges in response to a radially compressive force from the temperature sensitive shrinkable clamp disposed about said housing to reduce the diameter of said housing to a second smaller diameter.

22. The device as claimed in claim 21, wherein each of said plurality of first and second fingers includes a notch, said notches being aligned longitudinally when said housing is in a non-compressed state, and wherein said key member is engaged with said notches and includes a plurality of teeth alternating with grooves, said teeth being sized and spaced in order to engage the notches of said second fingers to prevent circumferential movement of said second fingers relative to said first fingers and said key member, and to disengage the notches of said second fingers as said key member is moved longitudinally by said trigger device to permit circumferential movement of said second fingers relative to said key member and said first fingers.

23. The device as claimed in claim 22, wherein the notches of said second fingers are disposed at the distal ends thereof, and wherein the notches of said first fingers are disposed proximate to the distal end of said first fingers forming channel notches in said first fingers.

24. The device as claimed in claim 21, wherein said first and second fingers have substantially the same curvature as the circumferential surface of said sleeve.

25. The device as claimed in claim 21, wherein said trigger device comprises a mounting bracket secured to one end of said housing, an activation lever is secured to one end of said key member, and pivot means securing said activation lever to said mounting bracket such that movement of said activation lever about said pivot means creates longitudinal movement of said key member to selectively disengage the key member from said second fingers.

26. The device as claimed in claim 25, wherein said trigger device further includes a socket member disposed at the opposite end of said housing from said mounting bracket, said key member including a tongue portion projecting through said socket member, and wherein said activation lever is angled outwardly from said housing when said key member is engaged with said second fingers and said key member tongue is projecting outwardly from said socket member as a visual indicator that said housing is in an open, non-compressed position, and wherein said activation lever is moved downwardly toward said housing surface to activate said key member to disengage said second fingers and to withdraw said tongue into said socket member.

27. The device as claimed in claim 21, wherein said longitudinal opening comprises at least approximately 15% of the cylindrical surface of said housing.

28. The device as claimed in claim 27, wherein said longitudinal opening comprises between 15–92% of the circumferential surface of said housing.

29. The device as claimed in claim 21, wherein a shrinkable clamp is disposed about said housing.

* * * * *